(12) United States Patent
Weber et al.

(10) Patent No.: US 9,489,559 B2
(45) Date of Patent: *Nov. 8, 2016

(54) ELECTRONIC DEVICE WITH FINGERPRINT SENSING SYSTEM AND CONDUCTING HOUSING

(71) Applicant: FINGERPRINT CARDS AB, Gothenburg (SE)

(72) Inventors: Sebastian Weber, Malmö (SE); Markus Andersson, Lomma (SE); Hans Thörnblom, Kungsbacka (SE); Frank Robert Riedijk, Delft (NL)

(73) Assignee: FINGERPRINT CARDS AB, Göteborg (SE)

( * ) Notice: Subject to any disclaimer, the term of this patent is extended or adjusted under 35 U.S.C. 154(b) by 64 days.

This patent is subject to a terminal disclaimer.

(21) Appl. No.: 14/718,776

(22) Filed: May 21, 2015

(65) Prior Publication Data
US 2015/0347807 A1 Dec. 3, 2015

(30) Foreign Application Priority Data
May 28, 2014 (SE) ...................................... 1450644

(51) Int. Cl.
*G06K 9/00* (2006.01)

(52) U.S. Cl.
CPC ............ *G06K 9/0002* (2013.01); *G06K 9/001* (2013.01); *G06K 9/0008* (2013.01)

(58) Field of Classification Search
CPC ... G06K 9/0002; G06K 9/0008; G06K 9/001
See application file for complete search history.

(56) References Cited

U.S. PATENT DOCUMENTS

| | | | | |
|---|---|---|---|---|
| 5,359,211 A | * | 10/1994 | Croft | ................... H01L 27/0251 257/173 |
| 6,111,734 A | * | 8/2000 | Harrington | ............ H02H 9/046 361/56 |
| 6,512,381 B2 | * | 1/2003 | Kramer | ................ A61B 5/1172 324/658 |

(Continued)

FOREIGN PATENT DOCUMENTS

| | | |
|---|---|---|
| EP | 2650823 A2 | 10/2013 |
| WO | 2011080262 A1 | 7/2011 |
| WO | 2011109694 A1 | 9/2011 |

OTHER PUBLICATIONS

PCT International Search Report and Written Opinion for PCT International Application No. PCT/SE2015/050613 mailed Aug. 31, 2015, 11 pages.

*Primary Examiner* — Feng Niu
(74) *Attorney, Agent, or Firm* — Remarck Law Group PLC

(57) ABSTRACT

The present invention relates to an electronic device comprising a fingerprint sensing system including a plurality of sensing elements, each being configured to capacitively couple to a finger arranged adjacent to the sensing element and to provide a sensing signal indicative of a response to a time-varying finger excitation signal provided to the finger; and an electrically conducting housing at least partly enclosing an interior of the electronic device. The electronic device further comprises housing connection circuitry connected to the electrically conducting housing, and arranged and configured to at least intermittently allow a potential of the electrically conducting housing to follow the finger excitation signal. Hereby the housing can be used to enhance the functionality of the fingerprint sensing system.

20 Claims, 7 Drawing Sheets

(56) References Cited

U.S. PATENT DOCUMENTS

| | | | |
|---|---|---|---|
| 7,099,497 B2* | 8/2006 | Chou | G06K 9/0002 |
| | | | 382/124 |
| 7,864,992 B2 | 1/2011 | Riedijk et al. | |
| 8,378,508 B2* | 2/2013 | Bond | G06K 9/0002 |
| | | | 257/688 |
| 8,724,038 B2* | 5/2014 | Ganapathi | G02B 26/0833 |
| | | | 345/173 |
| 9,122,901 B2* | 9/2015 | Slogedal | G06K 9/0002 |
| 9,152,841 B1* | 10/2015 | Riedijk | G06K 9/0002 |
| 9,396,379 B2* | 7/2016 | Slogedal | G06K 9/0002 |
| 2003/0063445 A1 | 4/2003 | Fischbach et al. | |
| 2009/0169071 A1 | 7/2009 | Bond et al. | |
| 2013/0271422 A1* | 10/2013 | Hotelling | G06F 3/044 |
| | | | 345/174 |
| 2014/0043254 A1 | 2/2014 | Goldbaum | |
| 2014/0218339 A1* | 8/2014 | Hotelling | G06F 3/044 |
| | | | 345/174 |

* cited by examiner

ELECTRONIC DEVICE WITH FINGERPRINT SENSING SYSTEM AND CONDUCTING HOUSING

CROSS-REFERENCE TO RELATED APPLICATIONS

This application claims the benefit of Swedish Patent Application No. 1450644-8, filed May 28, 2014. The disclosure of the above application is incorporated herein by reference in its entirety.

FIELD OF THE INVENTION

The present invention relates to an electronic device comprising a fingerprint sensing system and an electrically conducting housing.

BACKGROUND OF THE INVENTION

Various types of biometric systems are used more and more in order to provide for increased security and/or enhanced user convenience.

In particular fingerprint sensing systems have been adopted in, for example, consumer electronic devices, thanks to their small form factor, high performance and user acceptance.

Among the various available fingerprint sensing principles (such as capacitive, optical, thermal etc.), capacitive sensing is most commonly used, in particular in applications where size and power consumption are important issues.

All capacitive fingerprint sensors provide a measure indicative of the capacitance between several sensing structures and a finger placed on or moved across the surface of the fingerprint sensor.

Some capacitive fingerprint sensors passively read out the capacitance between the sensing structures and the finger. This, however, requires a relatively large capacitance. Therefore such passive capacitive sensors are typically provided with a very thin protective layer covering the sensing structures, which makes such sensors rather sensitive to scratching and/or ESD (electro-static discharge).

U.S. Pat. No. 7,864,992 discloses a fingerprint sensing system in which a finger excitation signal is injected into the finger by pulsing a conductive structure arranged in the vicinity of the sensor array and measuring the resulting change of the charge carried by the sensing structures in the sensor array.

Although the fingerprint sensing system according to U.S. Pat. No. 7,864,992 provides for an excellent combination of fingerprint image quality and sensor protection, there appears to be room for further improvement at least in certain applications.

SUMMARY

In view of above-mentioned and other drawbacks of the prior art, it is an object of the present invention to provide for improved fingerprint sensing. In particular, the present inventors have found that the fingerprint sensing performance can be improved in applications in which the user touches an electrically conducting housing while using the fingerprint sensing system. It would thus be desirable to provide for improved fingerprint sensing performance in an electronic device comprising an electrically conducting housing.

According to a first aspect of the present invention, it is therefore provided an electronic device comprising: a fingerprint sensing system including a plurality of sensing elements, each being configured to capacitively couple to a finger arranged adjacent to the sensing element and to provide a sensing signal indicative of a response to a time-varying finger excitation signal provided to the finger; an electrically conducting housing at least partly enclosing an interior of the electronic device; and housing connection circuitry connected to the electrically conducting housing, and arranged and configured to at least intermittently allow an electric potential of the electrically conducting housing to follow the finger excitation signal.

The finger excitation signal may advantageously be a pulse train applied to the finger. In synchronization with each pulse in the pulse train, a sensing signal from one or several of the sensing elements may be acquired. The sensing signal from a sensing element is indicative of the response of that particular sensing element to the finger excitation signal, which is in turn dependent on the capacitive coupling between the finger and that sensing element. The capacitive coupling is an indication of the distance between the fingerprint sensor surface and the finger surface, and thus of the fingerprint pattern of the finger.

The properties of the finger excitation signal should be selected such that the electric potential of the user's finger can follow the finger excitation signal. Moreover, it is desirable to be able to acquire the complete fingerprint pattern within a reasonable time, in particular for a swipe sensor. To achieve these requirements, the pulse repetition frequency of the finger excitation signal may advantageously be in the frequency range of approximately 1 kHz to 1 MHz.

The housing connection circuitry may be any circuitry connecting the electrically conducting housing to another circuitry comprised in the electronic device. The housing connection circuitry may be enclosed by the electrically conducting housing and thus be arranged inside the electronic device.

The housing connection circuitry may be integrated in a fingerprint sensor component or provided separately from the fingerprint sensor component.

According to a second aspect of the present invention, it is therefore provided a fingerprint sensor device for integration with an electronic device comprising an electrically conducting housing at least partly enclosing an interior of the electronic device, the fingerprint sensor device comprising: a plurality of sensing elements, each being configured to capacitively couple to a finger arranged adjacent to the sensing element and to provide a sensing signal indicative of a response to a time-varying finger excitation signal provided to the finger; and housing connection circuitry connectable to the electrically conducting housing, and, when connected to the housing, being arranged and configured to at least intermittently allow a potential of the electrically conducting housing to follow the finger excitation signal.

That the potential of the electrically conducting housing follows the finger excitation signal should be understood to mean that the potential of the electrically conducting housing exhibits a signal with the same pulse repetition frequency as the finger excitation signal and with an amplitude that is the same order of magnitude as the amplitude of the finger excitation signal. Advantageously, the amplitude of the signal on the housing may be at least 50% of the amplitude of the finger excitation signal.

The output from the fingerprint sensing system may be an authentication result, and/or a representation of the fingerprint pattern. Such a representation of the fingerprint pattern may, for example, be raw fingerprint image data, or the data may have been processed and may then be provided in the form of conditioned image data, as fingerprint template data or in any other form.

The present invention is based upon the realization that an electrically conducting housing of an electronic device with an integrated fingerprint sensing system may be used to enhance the functionality of the fingerprint sensing system. The present inventors have further realized that this can be achieved by at least intermittently allowing the potential of the electrically conducting housing to follow the finger excitation signal used for the fingerprint pattern acquisition.

Through embodiments of the present invention, the electrically conducting housing can thus support the fingerprint sensing system by at least assisting in providing the finger excitation signal to the user's finger and/or by acting as a reference sensing structure for acquiring a reference signal. The reference signal can be used for improving the fingerprint pattern acquisition in view of factors such as common mode noise and differing electrical properties of the finger (wet/dry fingers).

In embodiments of the electronic device according to the present invention, the electrically conducting housing can be the only structure used for providing the finger excitation signal to the finger, which provides for improved integration of the fingerprint sensor in the electronic device.

According to various embodiments of the present invention, the electrically conducting housing may constitute at least 10% of the outer surface of the electronic device. For instance, most of the back and the sides of a mobile phone may be made of metal (for improved reliability and an exclusive look and feel). In such and other embodiments, the electrically conducting housing may constitute at least 30% of the outer surface of the electronic device.

In some embodiments, the electrically conducting housing may constitute at least 50% of the outer surface of the electronic device. The electrically conducting housing may have openings to allow access to other functions, such as a display, buttons, a camera, a flash, the fingerprint sensor and various ports etc.

According to various embodiments of the present invention, the housing connection circuitry may further be arranged and configured to at least intermittently keep the potential of the electrically conducing housing at a reference potential for the electronic device.

The "reference potential" for the electronic device may, for example, be the electrical ground for the electronic device. By keeping the potential of the housing at the reference potential at least intermittently—and/or at least within a predefined frequency range—the electrically conducting housing can be allowed to fulfill any additional electrical functions it may have for the electronic device while at the same time assisting in the fingerprint pattern acquisition as described above. In a wireless communication device, such as a mobile phone, the electrically conducting housing may, for instance, be a part of certain wireless communication circuitry, such as for NFC (near field communication).

In some embodiments, the housing connection circuitry may comprise active circuitry controllable to switch the housing connection circuitry between a signal following state in which the potential of the electrically conducting housing is allowed to follow the finger excitation signal and a reference potential state in which the potential of the electrically conducting housing is kept at the reference potential for the electronic device.

The active circuitry may comprise one or several transistors, and may be controlled using a control signal that may, for example, originate from the fingerprint sensing system or other control circuitry comprised in the electronic device.

Furthermore, the active circuitry may comprise a plurality of switches arranged at mutually different locations, to allow grounding of the conducting housing at several location in applications where this is beneficial for other functions of the electronic device, such as for wireless transmission.

Such grounding/reference potential locations would typically be determined by RF-engineers responsible of the wireless functionality of the electronic device. ESD protection circuitry may also advantageously be coupled to each grounding location.

As an alternative or complement to the above-described active circuitry, the housing connection circuitry may comprise a filter allowing the potential of the electrically conducting housing to follow the finger excitation signal within a first frequency range and keeping the potential of the electrically conducting housing at the reference potential for the electronic device within a second frequency range higher than and separated from the first frequency range. For embodiments with multiple and mutually separated grounding locations, the filter comprised in the housing connection circuitry may include at least one filter component (such as a suitable capacitor) arranged at each grounding location.

The filter may advantageously be configured in such a way that the first frequency range includes frequencies below 1 MHz and the second frequency range includes frequencies above 800 MHz.

The first frequency range may advantageously correspond to the above-mentioned frequency range for the finger excitation signal, viz. approximately 1 kHz to approximately 1 MHz, and the second frequency range may advantageously correspond to frequencies for wireless communication, viz. approximately 800 MHz to approximately 2.1 GHz.

According to various embodiments, the filter may additionally be configured to keep the potential of the electrically conducting housing at the reference potential for the electronic device in a third frequency range including frequencies used for near field communication (NFC), i.e. between about 10 MHz and about 15 MHz. According to various embodiments of the present invention, the housing connection circuitry may further comprise ESD protection circuitry. Hereby electrostatic discharges can be prevented from damaging the fingerprint sensing circuitry or other parts of the electronic device.

The housing connection circuitry may further be connected to the fingerprint sensing system for at least intermittently interconnecting the fingerprint sensing system and the electrically conducting housing.

In embodiments, the fingerprint sensing system may comprise excitation circuitry for generating the finger excitation signal, and the fingerprint sensing system may be configured to provide the finger excitation signal to the electrically conducting housing, via the housing connection circuitry.

Moreover, the fingerprint sensing system may be configured to receive fingerprint sensing signals from the conducting housing, via the housing connection circuitry. In this case, the electrically conducting housing may function as a reference sensing structure. Also in this case, the potential of the housing is allowed to follow the finger excitation signal—the potential of the housing will be a reference signal that can be used for adapting one or more properties of the fingerprint sensing system to a fingerprint sensing situation (common mode noise or finger properties etc.).

According to various embodiments, furthermore, the electronic device may comprise wireless communication circuitry and an antenna connected to the wireless communication circuitry, the antenna being enclosed by the electrically conducting housing.

The housing connection circuitry may be controllable between a signal following state in which the potential of the electrically conducting housing is allowed to follow the finger excitation signal and a reference potential state in which the potential of the electrically conducting housing is kept at the reference potential for the electronic device; and the electronic device may comprise processing circuitry configured to control the wireless communication circuitry to only transmit signals via the antenna when the housing connection circuitry is in the reference potential state.

In summary, the present invention relates to an electronic device comprising a fingerprint sensing system including a plurality of sensing elements, each being configured to capacitively couple to a finger arranged adjacent to the sensing element and to provide a sensing signal indicative of a response to a time-varying finger excitation signal provided to the finger; and an electrically conducting housing at least partly enclosing an interior of the electronic device. The electronic device further comprises housing connection circuitry connected to the electrically conducting housing, and arranged and configured to at least intermittently allow a potential of the electrically conducting housing to follow the finger excitation signal. Hereby the housing can be used to enhance the functionality of the fingerprint sensing system.

BRIEF DESCRIPTION OF THE DRAWINGS

These and other aspects of the present invention will now be described in more detail, with reference to the appended drawings showing an example embodiment of the invention, wherein:

FIG. 1a schematically illustrates an example embodiment of the electronic device according to the present invention, in the form of a mobile phone having an electrically conducting housing and an integrated fingerprint sensor;

FIG. 1b is an enlarged view of the fingerprint sensor component being accessible through an opening in the conducting housing of the mobile phone in FIG. 1a;

FIG. 2 is a schematic block-diagram of the mobile phone in FIG. 1a;

FIG. 4b, shows an exemplary control signal configuration for the housing connection circuitry in FIG. 4a;

FIG. 5b, shows exemplary control signals for the housing connection circuitry in FIG. 5a;

DETAILED DESCRIPTION OF EXAMPLE EMBODIMENTS

In the present detailed description, various embodiments of the electronic device according to the present invention are mainly discussed with reference to a mobile phone having a metallic back cover with a fingerprint sensor of the swipe type being accessible through an opening in the metallic back cover.

It should be noted that this by no means limits the scope of the present invention, which equally well includes, for example, other types of electronic devices, such as laptop computers etc. Furthermore, the fingerprint sensor need not be of the swipe type, but may be of the touch type. Moreover, the electrically conducting housing may be touched by another part of the user's hand than the finger interacting with the fingerprint sensor. In addition, the various housing connection circuitry configurations described below, and other configurations, may advantageously be included in a fingerprint sensor module where applicable.

Figures 1A, 1B:
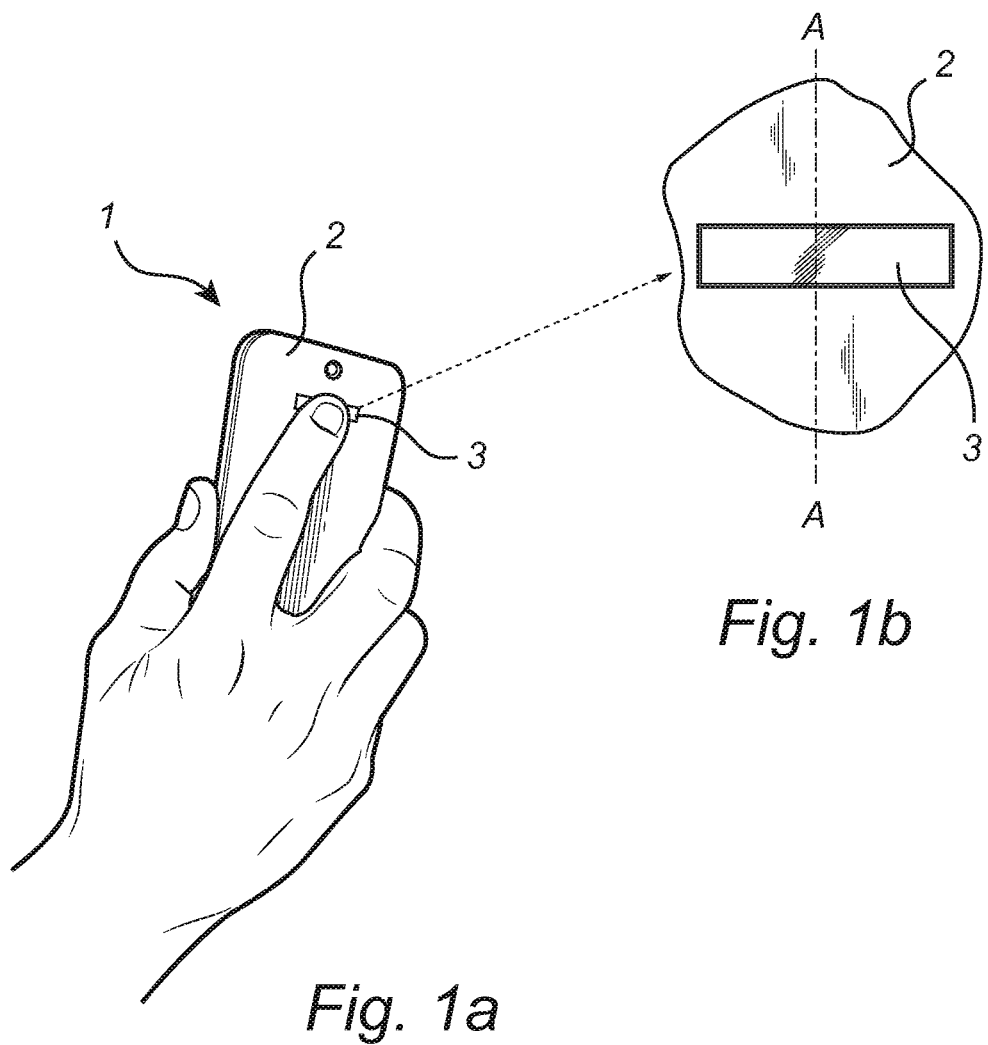

FIG. 1a schematically illustrates an example embodiment of the electronic device according to the present invention, in the form of a mobile phone 1 having an electrically conducting housing 2 and an integrated fingerprint sensor 3 being accessible through an opening in the conducting housing 2. The fingerprint sensor 3 may, for example, be used for unlocking the mobile phone 1 and/or for authorizing transactions carried out using the mobile phone etc.

FIG. 1b is an enlarged view of the fingerprint sensor 3 and its integration with the conducting housing 2.

Figure 2:
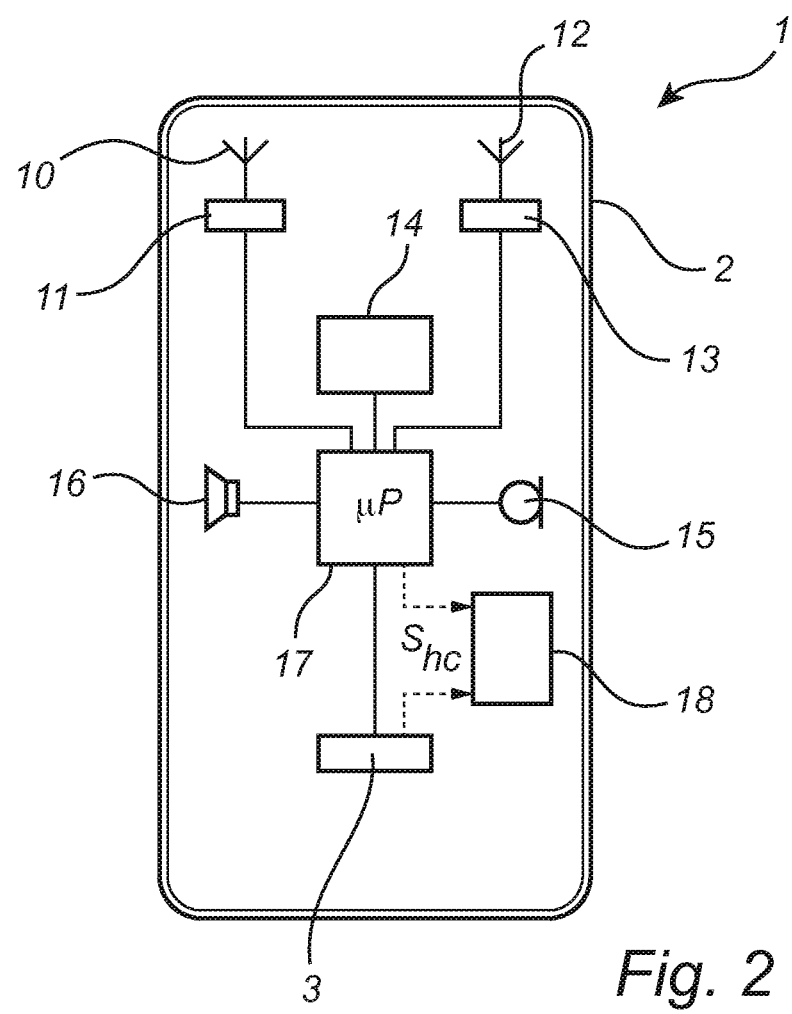

With reference to FIG. 2, which is a schematic block-diagram of the mobile phone is FIG. 1a, the mobile phone 1, in addition to the above-mentioned conducting housing 2 and fingerprint sensor 3, comprises a first antenna 10 for WLAN/Wi-Fi communication, a first wireless control unit 11, a second antenna 12 for telecommunication communication, a second wireless control unit 13, a display 14, a microphone 15, a speaker 16, a phone control unit 17, and housing connection circuitry 18.

As is schematically indicated in FIG. 2, the housing connection circuitry 18 may, depending on the particular application, receive control signals $S_{hc}$ from the fingerprint sensor 3 and/or from the phone control unit 17.

Two different example embodiments of the electronic device according to the present invention will now be described with reference to FIGS. 3a-b where a finger 19 is touching the surface of the fingerprint sensor 3.

Figure 3A:
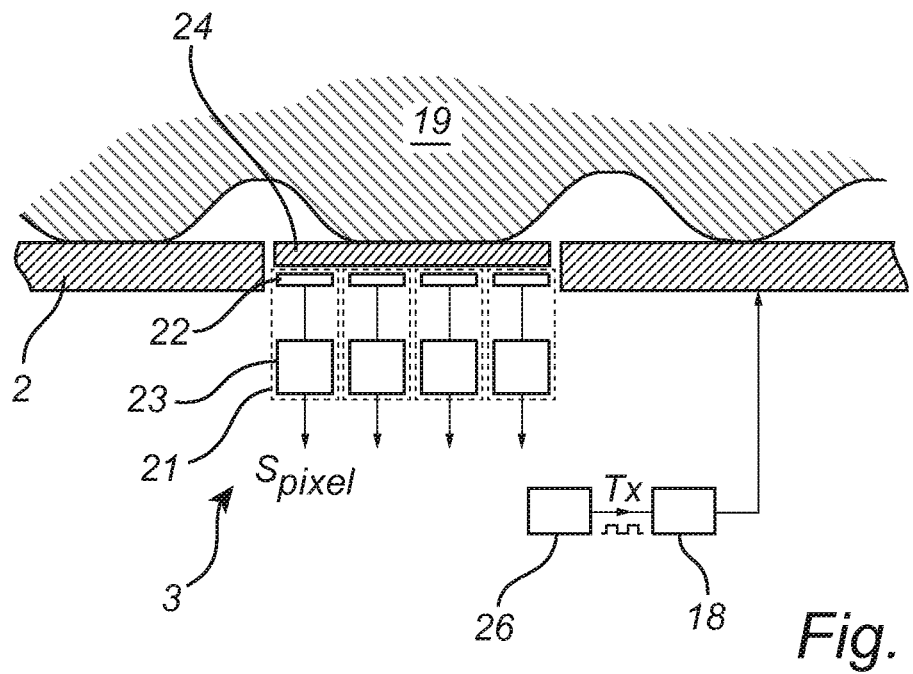
FIG. 3a is a schematic cross-section view of the fingerprint sensor assembly in FIG. 1b illustrating an embodiment where the conducting housing is used for providing the finger excitation signal to the finger.
Figure 3B:
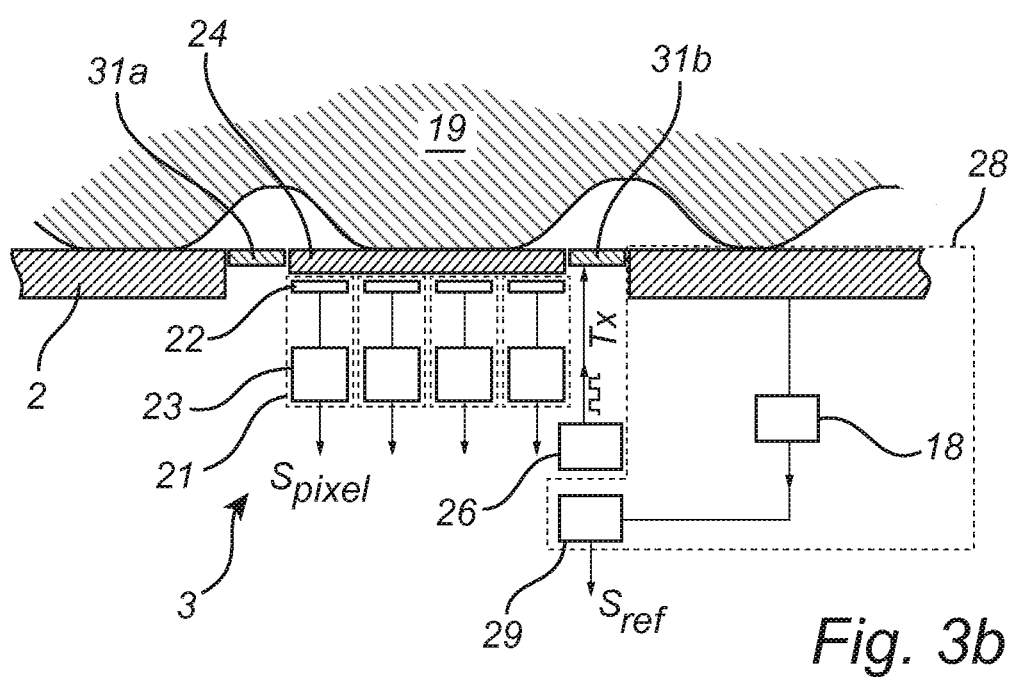
FIG. 3b is a schematic cross-section view of the fingerprint sensor assembly in FIG. 1b illustrating another embodiment where the conducting housing is used as a reference sensing structure.

To aid the understanding of the reader, each of FIGS. 3a-b is a hybrid of a schematic cross-section view and a functional block diagram.

FIG. 3a is a schematic cross-section view of the fingerprint sensor assembly in FIG. 1b illustrating an embodiment where the conducting housing 2 is used for providing the finger excitation signal to the finger 19.

Referring to FIG. 3a, the fingerprint sensor 3 comprises a plurality of sensing elements 21 (only one of the sensing elements has been indicated with a reference numeral to avoid cluttering the drawing), each including a sensing structure (plate) 22 and a sensing element circuit 23. As is schematically shown in FIG. 3a, the sensing structures 22 are protected by a dielectric layer 24, which is contacted by the user's finger 19. The fingerprint sensor 3 further comprises finger excitation circuitry 26 that is connected to the conductive housing 2 via the housing connection circuitry 18.

When the fingerprint sensor 3 is operating to detect a fingerprint pattern, the finger excitation circuitry 26 provides a finger excitation signal TX to the finger 19 via the housing connection circuitry 18 which is configured to at least intermittently allow the potential of the housing 2 to follow the finger excitation signal TX.

As is schematically illustrated in FIG. 3a, the finger excitation signal TX may be provided in the form of a pulse train having a pulse repetition frequency.

The coupling of the finger excitation signal TX from the finger 19 to the sensing structures 22 of the fingerprint sensor 3 is an indication of the capacitance between the finger and the respective sensing structures. Based on the pixel signals $S_{pixel}$ provided by the sensing elements 21, a representation of the fingerprint pattern can be determined.

FIG. 3b is a schematic cross-section view of the fingerprint sensor assembly in FIG. 1b illustrating another embodiment where the conducting housing 2 is used as a part of a reference sensing element 28 for providing a reference sensing signal $S_{ref}$ indicative of an average coupling between the fingerprint sensor 3 and the finger 19. As is shown in FIG. 3b, the reference sensing element further comprises a reference sensing circuit 29, connected to the housing 2 via the housing connection circuitry that at least intermittently allows the potential of the housing 2 to follow the finger excitation signal TX, whereby the reference sensing signal $S_{ref}$ can be acquired.

The reference sensing signal $S_{ref}$ can be used for improving the performance of the fingerprint sensor 3, in particular the capability of the fingerprint sensor 3 to handle situations with varying electrical properties of the finger (wet or dry) and/or the presence of interface, such as common mode noise.

As is schematically illustrated in FIG. 3b, the fingerprint sensor 3, in this example embodiment, further comprises first 31a and second 31b contact strips that are connected to the finger excitation circuitry 26 for providing the above-mentioned finger excitation signal TX to the finger 19.

Depending on the type of electronic device, it may be desirable to use the conducting housing 2 for other functions. For instance, the housing 2 may be a functional part of an antenna arrangement for wireless communication. For this and other reasons, it may, in various embodiments, be desirable to at least intermittently keep the potential of the housing 2 at a reference potential, such as electrical ground. For instance, the housing 2 may be grounded except during (part of) the operation of the fingerprint sensor 3 and/or the housing 2 may be grounded for a certain frequency range.

As will be appreciated by the skilled person, many different circuit layouts and/or physical layouts will be within the scope of the present invention. One example of a suitable pixel layout is provided in U.S. Pat. No. 7,864,992, which is hereby incorporated by reference in its entirety. One example sensing element configuration will be described further below with reference to FIGS. 7a-b.

Various example housing connection circuit configurations for achieving intermittent and/or frequency selective connection of the housing 2 to a reference potential will now be described with reference to FIGS. 4a-b, FIGS. 5a-b and FIG. 6.

Figure 4A:
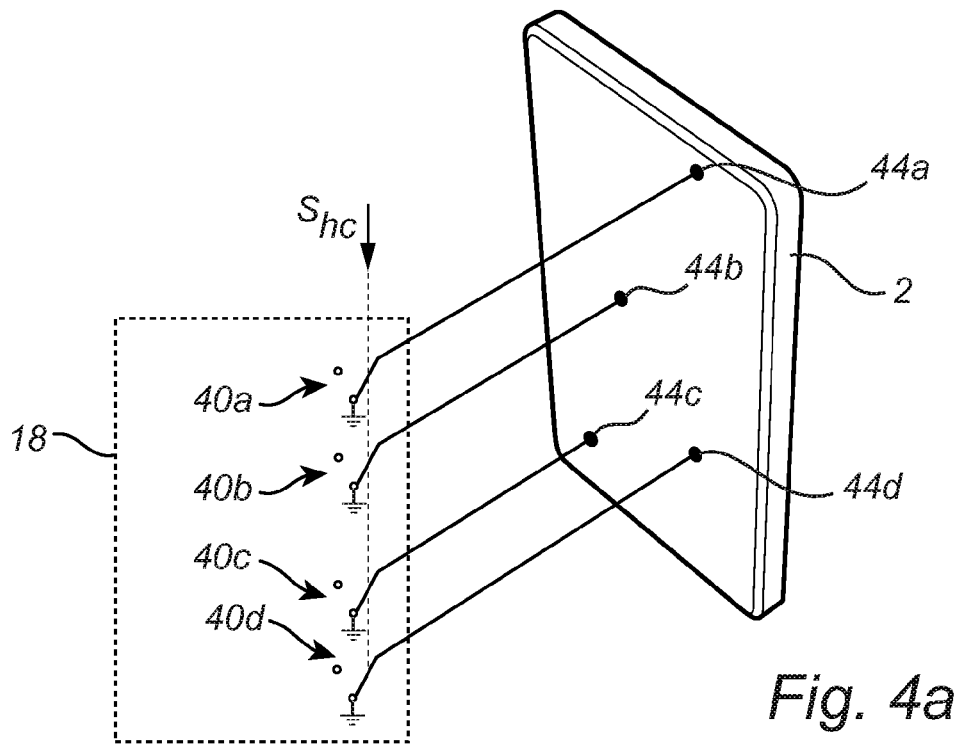
FIG. 4a schematically illustrates the housing connection circuitry comprised in a first embodiment of the electronic device according to the invention.

FIG. 4a is a schematic illustration of a first configuration of the housing connection circuit 18, for intermittently connecting the housing 2 to electrical ground and intermittently allowing the housing 2 to follow the finger excitation signal TX.

As can be seen in FIG. 4a, the first configuration of the housing connection circuit 18 comprises a plurality of switches 40a-d located at mutually different locations. Each of the switches 40a-d is controlled between a signal following state and a reference potential state through a housing control signal $S_{hc}$.

In FIG. 4a, the housing connection circuit 18 is shown to be in its reference potential state, which means that the housing 2 is grounded at several grounding locations 44a-d.

When the housing connection circuit 18 has been controlled to its signal following state, the direct connection to ground is broken.

As was mentioned above, the housing connection circuit 18 is controlled between the signal following state and the reference potential state using a housing control signal $S_{hc}$.

Figure 4B:
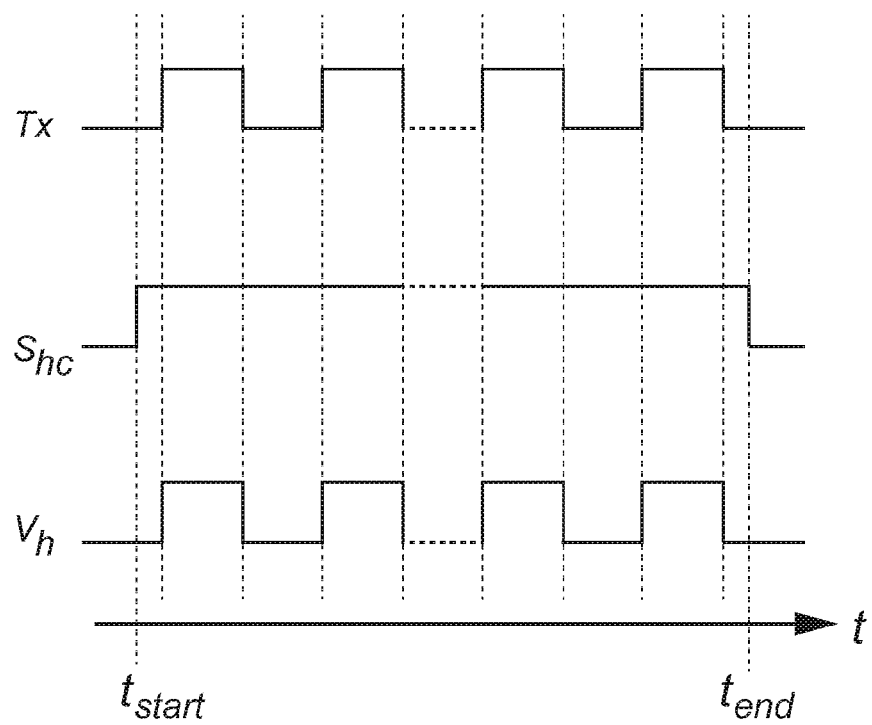

FIG. 4b schematically shows the finger excitation signal TX, an exemplary housing control signal $S_{hc}$ and the resulting housing potential, resulting from (referring to FIG. 3b) a user's finger 19 simultaneously touching the housing 2 and the control strips 31a-b when the fingerprint sensor 3 is in use.

As can be seen in FIG. 4b, the housing control signal $S_{hc}$ goes from low to high at a first time $t_{start}$, before the finger excitation signal TX is provided to the finger 19, and stays high until a second time $t_{end}$ when the finger excitation signal TX is no longer provided to the finger 19.

As a result, the housing control circuit will be in its signal following state during the time period between $t_{start}$ and $t_{end}$, so that the potential $V_h$ of the housing 2 is allowed to follow the finger excitation signal TX, through coupling via the user, as is schematically shown in FIG. 4b.

Instead of controlling the housing connection circuit 18 to be in its signal following state during a relatively long continuous period as described above and schematically indicated in FIG. 4b, the housing control signal $S_{hc}$ may be synchronized with the finger excitation signal TX. For instance, the housing control circuit 18 may be controlled between its reference potential state and its signal following state substantially in synchronization with the individual pulses of the pulse train forming the finger excitation signal TX. This will be described further below with reference to FIG. 5b.

Figure 5A:
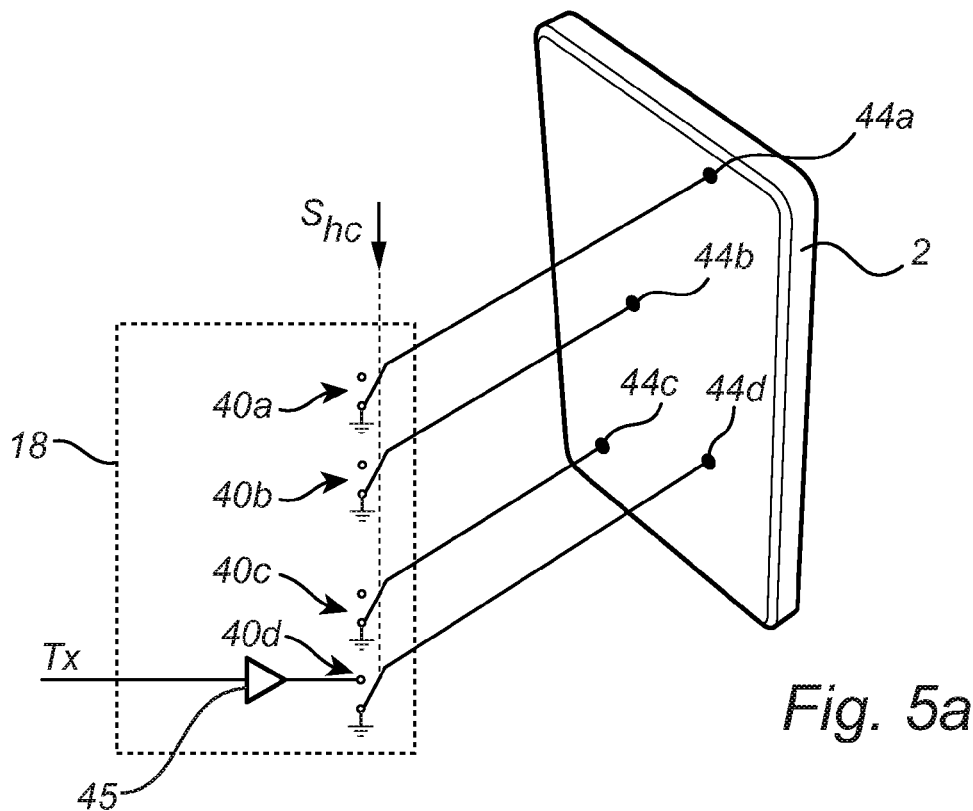
FIG. 5a schematically illustrates the housing connection circuitry comprised in a second embodiment of the electronic device according to the invention.

It should be understood that the housing control signal configurations described herein, and other configurations, are equally applicable to the housing control circuit configurations in FIG. 4a and FIG. 5a and variations thereof.

FIG. 5a is a schematic illustration of a second configuration of the housing connection circuit 18, for intermittently connecting the housing 2 to electrical ground and intermittently connecting the housing 2 to the finger excitation signal TX.

The configuration of the housing connection circuit 18 in FIG. 5a mainly differs from that described above with reference to FIG. 4a in that one 40d of the switches is connected to a driver 45 that is connected to the finger excitation signal TX, so that the finger excitation signal TX is directly provided to the housing 2 when the housing connection circuit 18 is in its signal following state.

Figure 5B:
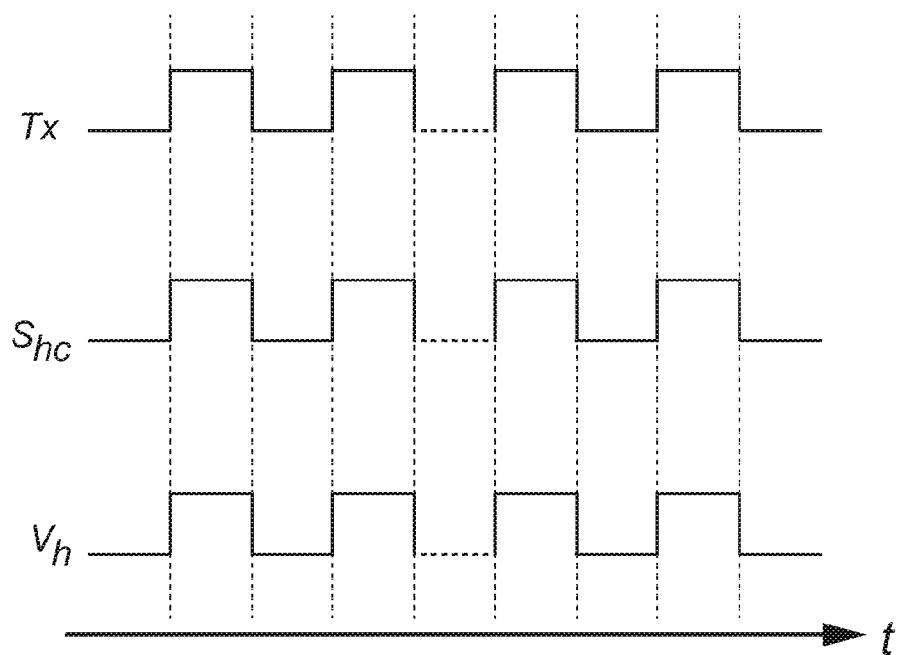

As can be seen in FIG. 5b, the housing control signal $S_{hc}$ is synchronized with the finger excitation signal TX, resulting in the housing potential $V_h$ following the finger excitation signal TX.

The switches in the above-described housing control circuit configurations may be implemented using any suitable circuitry, such as one or several transistors.

As an alternative to actively switching between a reference potential state and a signal following state, the selective connection of the housing 2 to a reference potential may be achieved using passive circuitry. This will now be described with reference to FIG. 6, which schematically illustrates a third housing circuit configuration.

Figure 6:
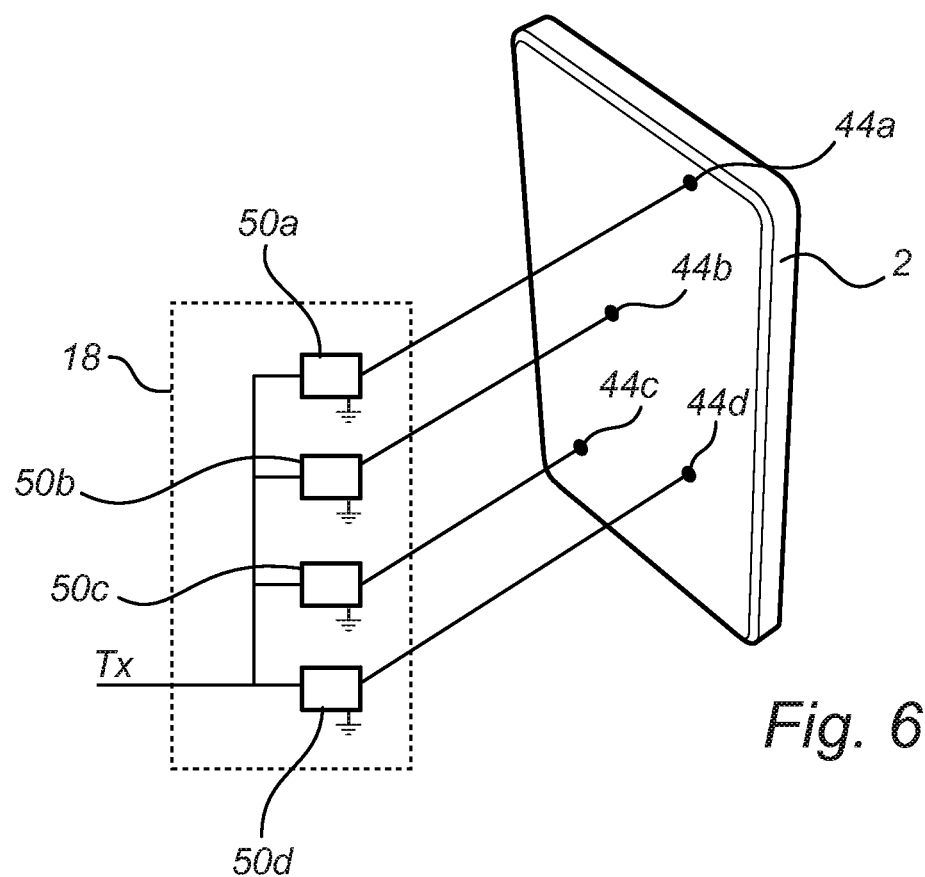
FIG. 6 schematically illustrates the housing connection circuitry comprised in a third embodiment of the electronic device according to the invention.

In the circuit configuration of FIG. 6, the switches shown in FIG. 4a and FIG. 5a have been replaced with filters 50a-d, such as band-stop filters or high-pass filters for grounding the conductive housing 2 at the grounding locations 44a-d for high frequencies (such as frequencies above 800 MHz) and connecting the conductive housing 2 (at the grounding locations 44a-d) to the finger excitation signal TX for low frequencies (such as frequencies below 1 MHz).

In a simple embodiment, each of the (high-pass) filters 50a may be provided in the form of a capacitor having a small capacitance, such as 56 pF. The skilled person, however, realizes that this is merely one example and that many other, per se known, filter configurations may be used to achieve the desired functionality.

An example configuration of the sensing elements 21 comprised in the fingerprint sensor 3 in FIGS. 3a-b will now be described with reference to FIGS. 7a-b.

Figure 7A:
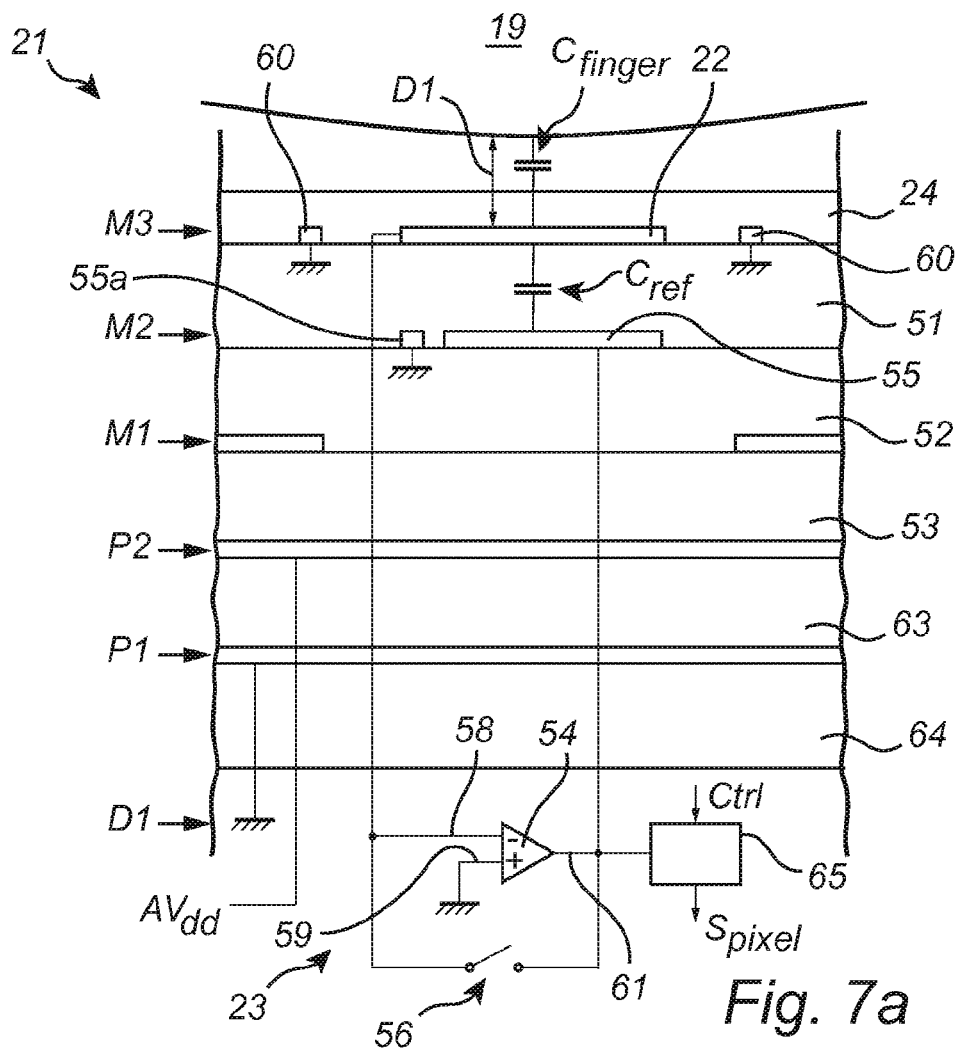
FIGS. 7a-b schematically illustrate example configurations of sensing elements comprised in embodiments of the fingerprint sensing system according to the present invention.

As can be seen in FIG. 7a, the sensing elements are formed in a layer structure comprising three conductive layers; a conductive layer M3 at the top, a conductive layer M2 in the middle and a lower conductive layer M1, with first 51, second 52, and third 53 layers of an insulating dielectric material under the respective conductive layers M3, M2, M1. Examples of materials for the conductive layers are typically copper, aluminum and doped polycrystalline silicone. Examples of materials for the insulating layers are typically $SiO_2$, SiN, $SiNO_x$ and spin-on glass.

In addition, the layered structure used to form the sensing elements 3 may comprise a fourth layer P2 (second polysilicon) constituted by an electrically conducting layer which is kept at a certain analog voltage potential $AV_{dd}$. Further, there is a fifth layer P1 (first polysilicon) that is also constituted by an electrically conducting layer which is kept at ground potential, working as an electric shielding. Under each one of these layers P2, P1 there are fourth 63 and fifth 64 layers of an insulating dielectric material. At the bottom, there is a semi conductive substrate layer D1 comprising active components such as the charge amplifiers 54. The conductive layers P2, P1 as well as the lower conductive layer M1 described above, may for example be used for routing of electrical connections, resistors and electrical shielding. One of the conductive layers P2, P1 may also be used to form the lower electrode 55 of each sensing element 21 instead of the second metal layer M2.

The sensing element 21 shown in FIG. 7a comprises a sensing structure 22 formed in the top conductive layer M3. The sensing structure 22 is connected to a sensing element circuit 23 comprising a charge amplifier 54, a lower electrode 55, a reset switch 56, and sample-and-hold circuitry 65.

As can be seen in FIG. 7a, the sensing structure 22 is connected to the negative input terminal 58 of the charge amplifier 54. The positive input terminal 59 of the charge amplifier 54 is connected to ground. Hence, by means of the charge amplifier 54, the corresponding sensing structure 22 is virtually grounded, since the voltage over the input terminals 58, 59 of the charge amplifier 54 is almost zero. Depending on the circuit implementation of the charge amplifier there may be a small substantially constant voltage, such as the gate voltage of a CMOS transistor, between the negative 58 and positive 59 input terminals of the operational amplifier.

Figure 7B:
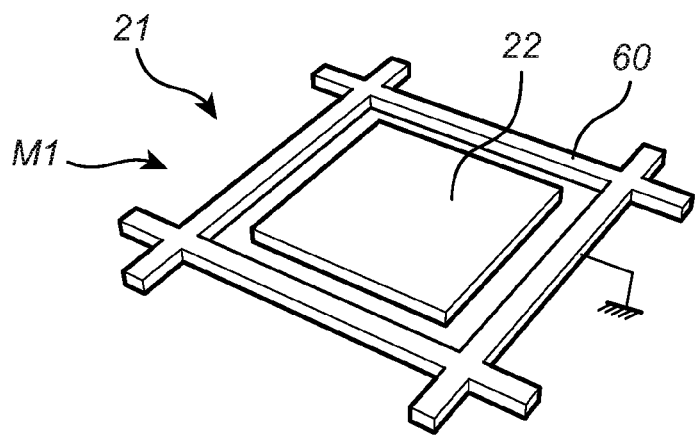

As can also be seen in FIG. 7b, each sensing structure 22 may be surrounded by a shield frame 60 formed in the top conductive layer M3, where the shield frame 60 is connected to ground potential as a conductive shielding to prevent lateral parasitic capacitances between adjacent sensing structures 22, thus preventing or at least reducing so-called crosstalk between the sensing elements 21. The shield frame 60 may also be connected to another suitable potential.

Further, referring again to FIG. 7a, there is a protective dielectric layer 24 covering each of the sensing structures 22, to protect the sensing elements 21 from ESD (Electrostatic Discharge) and external wear. A finger 19 that comes into the vicinity of the upper surface of the protective layer 24 gives rise to a capacitance $C_{finger}$ between the finger 19 and the sensing structure 22.

As can be seen in FIG. 7a, the lower electrode 55 comprised in the sensing element circuit 23 is formed in the middle conductive layer M2. The lower electrode 55 is connected to an output terminal 61 of the charge amplifier 54. There is a feedback capacitance $C_{ref}$ formed between the sensing structure 22 and each lower electrode 55, which feedback capacitance $C_{ref}$ is connected between the negative input terminal 58 of the charge amplifier 54 and the output terminal 61.

An auxiliary lower electrode 55a is also formed in the middle conductive layer M2, adjacent to the lower electrode 55. The auxiliary lower electrode 55a is connected to ground and used as an extra shielding, since the lower electrode 55 may typically have a smaller area than the sensing structure 22.

The lower electrode 55 may be configured to achieve the desired gain for the sensor element circuit 23. In particular, the size of the lower electrode 55 may be suitably selected, since the gain depends on the feedback capacitance $C_{ref}$, which in turn is dependent on the physical dimensions of the sensing structure 22, the lower electrode 55, and the first insulating layer 51. The size of the auxiliary lower electrode 55a may be adjusted so as to fit beside the lower electrode 55.

As described above, an excitation signal TX may be provided to the finger 19. The provision of the excitation signal TX to the finger 19 results in a change of the charge carried by the sensing structures 22 (as well as the reference sensing structure 25 in embodiments where a separate reference sensing structure 25 is provided).

The change of charge that is carried by the sensing structure 22 is proportional to the capacitance $C_{finger}$ between the skin and the sensing structure 22. As the sensing structure 22 is virtually grounded, its charge is transferred by the charge amplifier 54 to the lower electrode 55. We may then calculate the voltage output from the charge amplifier 54 as:

$$U_{out} = (C_{finger}/C_{ref})U_{in}$$

The output voltage $U_{out}$ is sampled by the sample-and-hold circuitry 65, preferably using correlated double-sampling to remove the low frequency component of the common mode noise.

The sample-and-hold circuitry 65 is controlled by a control signal and outputs the pixel signal $S_{pixel}$ indicative of the capacitive coupling between sensing structure 22 and finger 19 to an analog-to-digital converter (not shown).

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. An electronic device comprising:
a fingerprint sensing system including a plurality of sensing elements, each being configured to capacitively couple to a finger arranged adjacent to said sensing element and to provide a sensing signal indicative of a response to a time-varying finger excitation signal provided to said finger;
an electrically conducting housing at least partly enclosing an interior of said electronic device; and
housing connection circuitry connected to said electrically conducting housing, and arranged and configured to at least intermittently allow a potential of said electrically conducting housing to follow said finger excitation signal, and to at least intermittently keep the potential of said electrically conducing housing at a reference potential for said electronic device,
wherein said housing connection circuitry comprises active circuitry,
said active circuitry being controllable to switch said housing connection circuitry between a signal following state in which the potential of said electrically conducting housing is allowed to follow said finger excitation signal and a reference potential state in which the potential of said electrically conducting housing is kept at the reference potential for said electronic device.

2. The electronic device according to claim 1, wherein said electrically conducting housing constitutes at least 10% of an outer surface of the electronic device.

3. The electronic device according to claim 1, wherein said housing connection circuitry is enclosed by said electrically conducting housing.

4. The electronic device according to claim 1, wherein said active circuitry comprises a plurality of switches arranged at mutually different locations.

5. The electronic device according to claim 1, wherein said housing connection circuitry further comprises ESD protection circuitry.

6. The electronic device according to claim 1, wherein said housing connection circuitry is further connected to said fingerprint sensing system.

7. The electronic device according to claim 6, wherein said fingerprint sensing system comprises excitation circuitry for generating said finger excitation signal, said fingerprint sensing system being configured to provide said finger excitation signal to the electrically conducting housing, via the housing connection circuitry.

8. The electronic device according to claim 6, wherein said fingerprint sensing system is configured to receive fingerprint sensing signals from the conducting housing, via the housing connection circuitry.

9. The electronic device according to claim 1, wherein said electronic device comprises wireless communication circuitry and an antenna connected to said wireless communication circuitry,
said antenna being enclosed by said electrically conducting housing.

10. The electronic device according to claim 9, wherein:
said housing connection circuitry is controllable between a signal following state in which the potential of said electrically conducting housing is allowed to follow said finger excitation signal and a reference potential state in which the potential of said electrically conducting housing is kept at the reference potential for said electronic device; and
said electronic device comprises processing circuitry configured to control said wireless communication circuitry to only transmit signals via said antenna when the housing connection circuitry is in said reference potential state.

11. An electronic device comprising:
a fingerprint sensing system including a plurality of sensing elements, each being configured to capacitively couple to a finger arranged adjacent to said sensing element and to provide a sensing signal indicative of a response to a time-varying finger excitation signal provided to said finger;
an electrically conducting housing at least partly enclosing an interior of said electronic device; and
housing connection circuitry connected to said electrically conducting housing, and arranged and configured to at least intermittently allow a potential of said electrically conducting housing to follow said finger excitation signal, and to at least intermittently keep the potential of said electrically conducing housing at a reference potential for said electronic device,
wherein said housing connection circuitry comprises a filter allowing the potential of said electrically conducting housing to follow said finger excitation signal within a first frequency range and keeping the potential of said electrically conducting housing at the reference potential for said electronic device within a second frequency range separated in frequency from said first frequency range, said second frequency range including higher frequencies than said first frequency range.

12. The electronic device according to claim 11, wherein said filter is configured in such a way that said first frequency range includes frequencies below 1 MHz and said second frequency range includes frequencies above 800 MHz.

13. The electronic device according to claim 11, wherein said housing connection circuitry further comprises ESD protection circuitry.

14. The electronic device according to claim 11, wherein said housing connection circuitry is further connected to said fingerprint sensing system.

15. The electronic device according to claim 14, wherein said fingerprint sensing system comprises excitation circuitry for generating said finger excitation signal, said fingerprint sensing system being configured to provide said finger excitation signal to the electrically conducting housing, via the housing connection circuitry.

16. The electronic device according to claim 14, wherein said fingerprint sensing system is configured to receive fingerprint sensing signals from the conducting housing, via the housing connection circuitry.

17. The electronic device according to claim 11, wherein said electronic device comprises wireless communication circuitry and an antenna connected to said wireless communication circuitry, said antenna being enclosed by said electrically conducting housing.

18. The electronic device according to claim 17, wherein:
said housing connection circuitry is controllable between a signal following state in which the potential of said electrically conducting housing is allowed to follow said finger excitation signal and a reference potential state in which the potential of said electrically conducting housing is kept at the reference potential for said electronic device; and
said electronic device comprises processing circuitry configured to control said wireless communication circuitry to only transmit signals via said antenna when the housing connection circuitry is in said reference potential state.

19. A fingerprint sensor device for integration with an electronic device comprising an electrically conducting housing at least partly enclosing an interior of said electronic device, said fingerprint sensor device comprising:
a plurality of sensing elements, each being configured to capacitively couple to a finger arranged adjacent to said sensing element and to provide a sensing signal indicative of a response to a time-varying finger excitation signal provided to said finger; and
housing connection circuitry connectable to said electrically conducting housing, and, when connected to said housing, being arranged and configured to at least intermittently allow a potential of said electrically conducting housing to follow said finger excitation signal, and to at least intermittently keep the potential of said electrically conducing housing at a reference potential for said electronic device,
wherein said housing connection circuitry comprises active circuitry,
said active circuitry being controllable to switch said housing connection circuitry between a signal following state in which the potential of said electrically conducting housing is allowed to follow said finger excitation signal and a reference potential state in which the potential of said electrically conducting housing is kept at the reference potential for said electronic device.

20. A fingerprint sensor device for integration with an electronic device comprising an electrically conducting housing at least partly enclosing an interior of said electronic device, said fingerprint sensor device comprising:
a plurality of sensing elements, each being configured to capacitively couple to a finger arranged adjacent to said sensing element and to provide a sensing signal indicative of a response to a time-varying finger excitation signal provided to said finger; and
housing connection circuitry connectable to said electrically conducting housing, and, when connected to said housing, being arranged and configured to at least intermittently allow a potential of said electrically conducting housing to follow said finger excitation signal, and to at least intermittently keep the potential of said electrically conducing housing at a reference potential for said electronic device,
wherein said housing connection circuitry comprises a filter allowing the potential of said electrically conducting housing to follow said finger excitation signal within a first frequency range and keeping the potential of said electrically conducting housing at the reference potential for said electronic device within a second frequency range separated in frequency from said first frequency range, said second frequency range including higher frequencies than said first frequency range.

* * * * *